US009372651B2

(12) United States Patent
Hagiwara et al.

(10) Patent No.: US 9,372,651 B2
(45) Date of Patent: Jun. 21, 2016

(54) PROCESSING DOCUMENTS IN A HOT FOLDER FOR PRINTING

(71) Applicant: CANON KABUSHIKI KAISHA, Tokyo (JP)

(72) Inventors: Shogo Hagiwara, Tokyo (JP); Yosuke Ito, Kawasaki (JP); Yuji Kojima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/666,270

(22) Filed: Mar. 23, 2015

(65) Prior Publication Data

US 2015/0193177 A1  Jul. 9, 2015

Related U.S. Application Data

(63) Continuation of application No. 13/323,476, filed on Dec. 12, 2011, now Pat. No. 9,013,738.

(30) Foreign Application Priority Data

Dec. 24, 2010 (JP) ................................. 2010-288554

(51) Int. Cl.
*G06F 3/12* (2006.01)

(52) U.S. Cl.
CPC .............. *G06F 3/127* (2013.01); *G06F 3/1204* (2013.01); *G06F 3/1208* (2013.01); *G06F 3/1212* (2013.01); *G06F 3/1285* (2013.01)

(58) Field of Classification Search
CPC ................................ G06F 3/127; G06F 3/1204

USPC ......................................................... 358/1.15
See application file for complete search history.

(56) References Cited

U.S. PATENT DOCUMENTS

| 7,957,028 B2 | 6/2011 | Nakaya et al. |
| 8,503,011 B2 | 8/2013 | Sakurai |
| 2006/0176498 A1 | 8/2006 | Wada et al. |
| 2007/0005561 A1* | 1/2007 | Sakura .................. G06F 3/1205 |
| 2007/0133048 A1 | 6/2007 | Nakaya et al. |
| 2008/0239387 A1 | 10/2008 | Otsuka |
| 2009/0273799 A1* | 11/2009 | Hanawa ........................ 358/1.9 |
| 2010/0097647 A1 | 4/2010 | Sakurai |

(Continued)

FOREIGN PATENT DOCUMENTS

| JP | 2006-195923 A | 7/2006 |
| JP | 2006-222661 A | 8/2006 |

(Continued)

OTHER PUBLICATIONS

XP55067514, "Hotfolder Prints—General Operation", http://breezesys.com/Hotfolder/help/general_operation.htm, Nov. 2010.

(Continued)

*Primary Examiner* — Eric A Rust
(74) *Attorney, Agent, or Firm* — Fitzpatrick, Cella, Harper & Scinto (57) ABSTRACT

When it is detected that a file has been stored in a hot folder, an apparatus stands by for a predetermined period of time not to process the file based on settings associated with the hot folder. When the predetermined period of time elapses, the apparatus processes the file based on the settings associated with the hot folder.

9 Claims, 5 Drawing Sheets

(56) References Cited

U.S. PATENT DOCUMENTS

| | | |
|---|---|---|
| 2011/0299130 A1 | 12/2011 | Ito |
| 2012/0162705 A1 | 6/2012 | Kodama et al. |
| 2012/0182580 A1 | 7/2012 | Yamashita et al. |

FOREIGN PATENT DOCUMENTS

| | | |
|---|---|---|
| JP | 2007-164507 A | 6/2007 |
| JP | 2008-250689 A | 10/2008 |
| JP | 2010-20489 A | 1/2010 |
| JP | 2010-99891 A | 5/2010 |

OTHER PUBLICATIONS

"Hotfolder Prints", Breeze Systems Ltd., Dec. 10, 2010.

* cited by examiner

PROCESSING DOCUMENTS IN A HOT FOLDER FOR PRINTING

This application is a continuation of U.S. application Ser. No. 13/323,476, filed Dec. 12, 2011 (pending), the contents of which are incorporated herein by reference.

BACKGROUND OF THE INVENTION

1. Field of the Invention

The present invention relates to an information processing apparatus for processing a hot folder, an information processing method, and a storage medium storing a program.

2. Description of the Related Art

A hot folder for printing without describing print settings is known, which enables a user to more readily print. This is a technique for copying job data to be printed in a folder set as a hot folder (inputting a print job), and performing print processing. An application which uses a hot folder, an operator who performs a GUI operation, or the like copies job data in a hot folder as a trigger to execute print processing.

Japanese Patent Laid-Open No. 2006-222661 describes a method for detecting job data input in a hot folder. According to Japanese Patent Laid-Open No. 2006-222661, input of job data is determined based on event data sent when a folder name is changed and the job data is transmitted to a print control apparatus, which can eliminate the need for periodic polling in a hot folder.

A job may be input in a hot folder between different OSs. When a job is input (a file is stored by a copy operation or the like) between different OSs, a delay in starting a file lock occurs. Note that a file lock indicates access control performed by an OS for a file being copied.

In general, when a file is copied in a hot folder using drag-and-drop, it is in a locked state immediately after the copy operation starts until the copy operation is completed. A hot folder program checks that a target file is not in a locked state, and then performs processing such as output of the file to a printing apparatus.

If a file is copied in a hot folder between different OSs, however, a delay in starting a file lock may occur. Consequently, until a file lock starts, the hot folder program recognizes that the file is not in a locked state. Even though the file is being copied, therefore, the hot folder program starts processing such as output to a printing apparatus, thereby giving an inappropriate processing result.

SUMMARY OF THE INVENTION

An aspect of the present invention is to eliminate the above-mentioned problems with the conventional technology. The present invention provides an information processing apparatus which performs appropriate processing for a file even when the file is stored in a hot folder between different OSs, an information processing method, and a storage medium storing a program.

The present invention in its first aspect provides an information processing apparatus for processing a file stored in a hot folder, comprising: a detection unit configured to detect that the file has been stored in the hot folder; a processing unit configured to process the file based on settings associated with the hot folder; and a control unit configured to control, when the detection unit detects the file, the processing unit to stand by for a predetermined period of time not to process the file based on the settings associated with the hot folder.

The present invention in its second aspect provides an information processing method which is executed in an information processing apparatus for processing a file stored in a hot folder, comprising: a detection step of detecting that the file has been stored in the hot folder; a processing step of processing the file based on settings associated with the hot folder; and a control step of controlling, when the file is detected in the detection step, the processing step to stand by for a predetermined period of time not to process the file based on the settings associated with the hot folder.

The present invention in its third aspect provides a computer-readable storage medium storing a program for causing a computer to execute a detection step of detecting that a file has been stored in a hot folder; a processing step of processing the file based on settings associated with the hot folder; and a control step of controlling, when the file is detected in the detection step, the processing step to stand by for a predetermined period of time not to process the file based on the settings associated with the hot folder.

According to the present invention, it is possible to perform appropriate processing for a file even when the file is stored in a hot folder between different OSs.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a repetitive description thereof will be omitted.

First Embodiment

Figure 1:
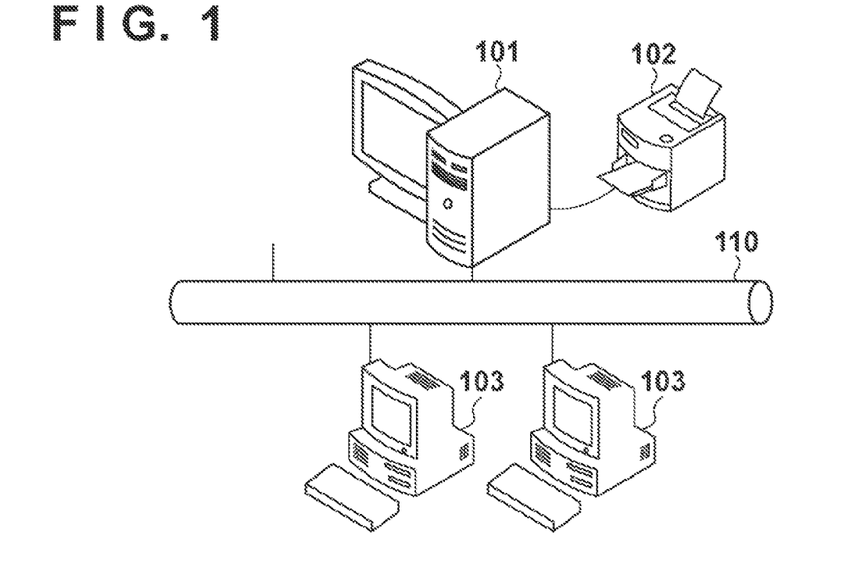
FIG. 1 is a view showing the overall configuration of an information processing system.

FIG. 1 is a view showing the overall configuration of an information processing system according to the embodiment of the present invention. An information processing apparatus 101 shown in FIG. 1 may be, for example, a PC or a dedicated terminal. In this embodiment, a PC is used as the information processing apparatus 101. In this embodiment, assume that a hot folder shared by users has been created in the information processing apparatus 101. A hot folder, however, may be created in, for example, an external mass storage device. A printing apparatus 102 (to also be referred to as a printer hereinafter) is connected with the information processing apparatus 101. Although the printing apparatus 102 is directly connected with the information processing apparatus 101 in the embodiment, it may be connected with the apparatus 101 via a network 110 (to be described later). The printing apparatus 102 is, for example, a laser printer, an inkjet printer, or a thermal printer. The printing apparatus 102 prints based on data input to the hot folder. An information processing apparatus 103 serves as a PC for inputting print data to the hot folder of the information processing apparatus 101. The information processing apparatus 103 can refer to the hot folder of the information processing apparatus 101 shared by the users via the network 110. The user can print based on data from the printing apparatus 102 by only storing the data in the hot folder of the information processing apparatus 101 from the information processing apparatus 103. The network 110 may be a wired or wireless LAN.

Figure 2:
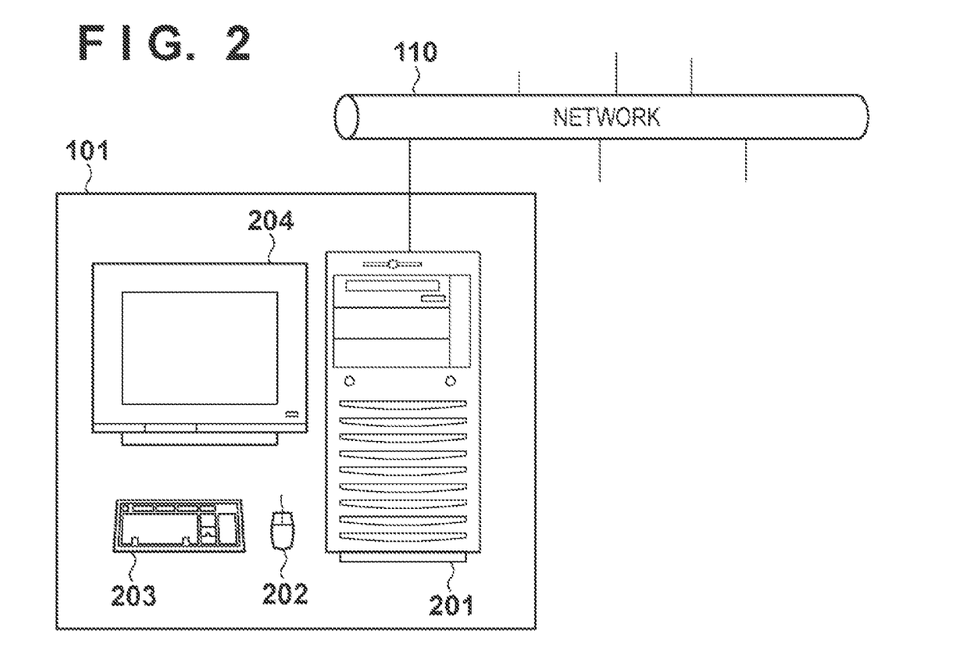
FIG. 2 is a view showing the hardware configuration of an information processing apparatus for managing a hot folder.

FIG. 2 is a view showing the hardware configuration of the information processing apparatus 101 for managing the hot folder. A pointing device 202, a keyboard 203, and a display 204 are connected to corresponding input/output terminals of a main body 201, respectively. In the embodiment, the information processing apparatus 103 has the same configuration as that of the information processing apparatus 101.

Figure 3:
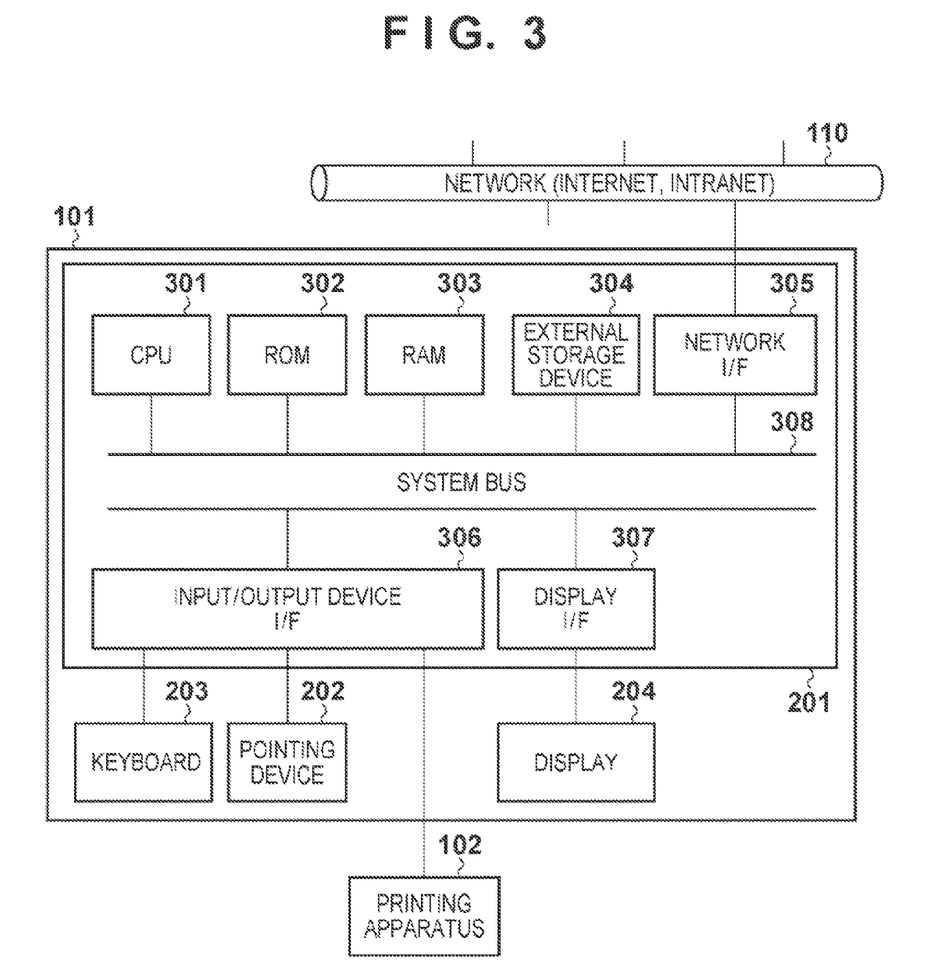
FIG. 3 is a block diagram showing the block configuration of the information processing apparatus for managing a hot folder.

FIG. 3 is a block diagram showing the block configuration of the information processing apparatus 101 for managing the hot folder. A print function using the hot folder is executed by a hot folder program on the computer. More specifically, the apparatus 101 includes a CPU 301, a ROM 302, a RAM 303, an external storage device 304, a network I/F 305, an input/output device I/F 306, a display I/F 307, a system bus 308, the display 204, the keyboard 203, and the pointing device 202.

The CPU 301 controls the information processing apparatus 101 as a whole. The ROM 302 is a read only memory. An example of the ROM 302 includes a PROM in which the user can electrically write a program, and a mask ROM in which contents are written in manufacturing. In the embodiment, the ROM 302 may be either of them. The RAM 303 is a memory for which it is possible to freely perform a write/read operation. The RAM 303 serves to temporarily store data when performing processing in this embodiment. The external storage device 304 is a non-volatile storage device. An example of the external storage device 304 includes an HD drive, FD drive, MO drive, CD-RW drive, and DVD-RW drive. The external storage device 304 stores the hot folder program and data necessary for the operation of the hot folder program.

The network I/F 305 performs communication control for connecting to the network such as an intranet, and various communication interfaces may be used depending on a user environment. The network I/F 305 may be, for example, a wireless LAN interface or an Ethernet interface.

The input/output device I/F 306 processes an input/output from the keyboard 203, pointing device 202, or printing apparatus 102 of the information processing apparatus 101, and is used in operating the information processing apparatus 101 and inputting/outputting data. The display I/F 307 processes an input/output to/from the display 204. The display 204 may be implemented by, for example, a CRT, a liquid crystal display, a plasma display, a rear projection television, or a front projector, and its control circuit. Communication of various data and power supply between the blocks of the information processing apparatus 101 are implemented via the system bus 308. The system bus 308 includes an address line, data line, control line, and power supply/ground line.

Figure 4:
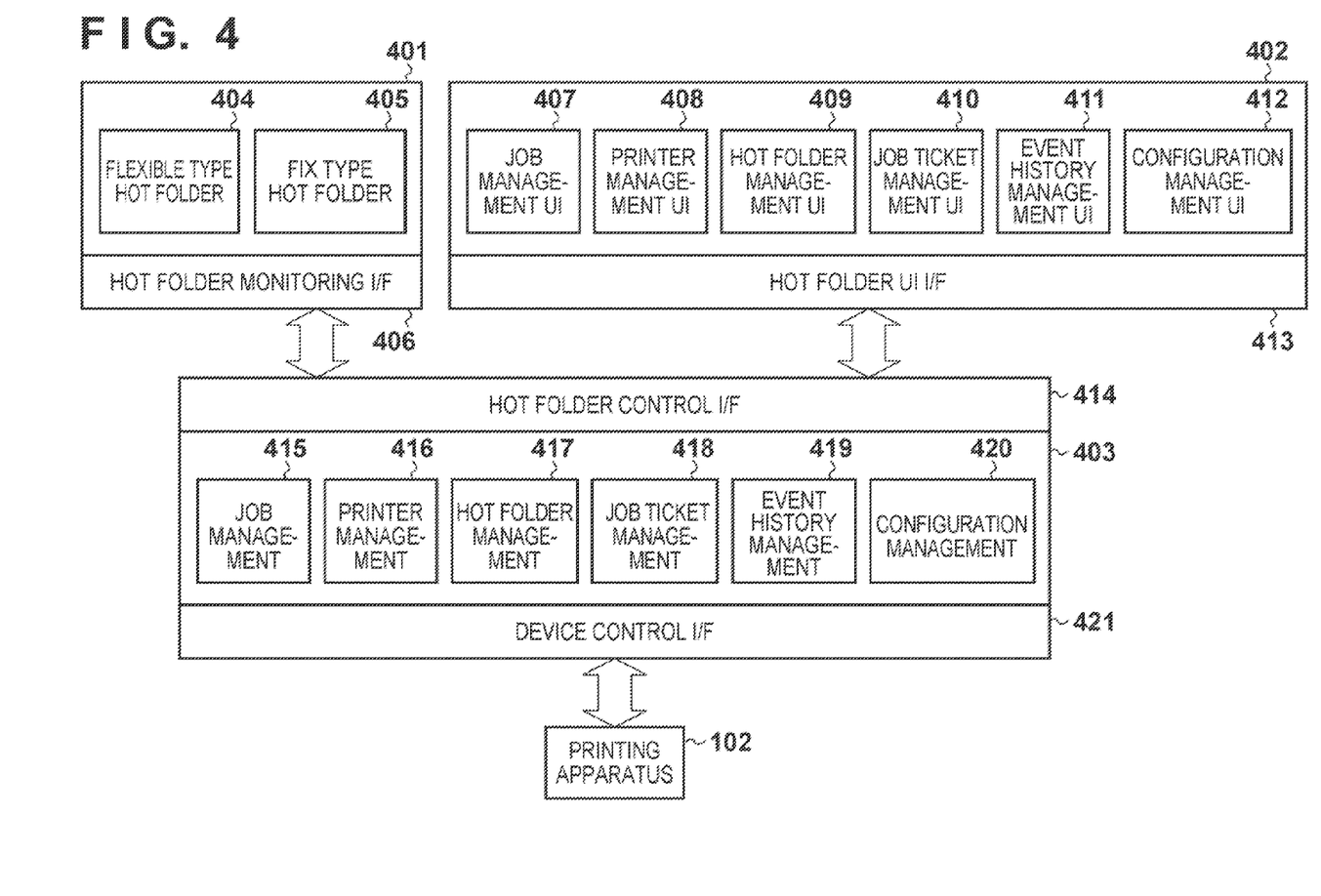
FIG. 4 is a block diagram showing the structure of a hot folder program.

FIG. 4 is a block diagram showing the structure of the hot folder program of the information processing apparatus 101. The hot folder program includes a hot folder monitoring module 401, a hot folder UI 402, and a hot folder control module 403. The hot folder monitoring module 401 monitors the hot folder, and detects job data. The hot folder UI 402 controls information about the hot folder displayed on the display. The hot folder control module 403 controls the hot folder.

The hot folder monitoring module 401 includes a flexible type hot folder monitoring module 404, a fix type hot folder monitoring module 405, and a hot folder monitoring I/F 406. The flexible type hot folder monitoring module 404 monitors a folder settings of which can be changed for each printing operation. The fix type hot folder monitoring module 405 monitors a folder settings of which are not changed for each printing operation. When a new print request is sent, the hot folder monitoring I/F 406 sends a print request to the hot folder control module 403.

The hot folder UI 402 includes a job management UI 407, a printer management UI 408, a hot folder management UI 409, a job ticket management UI 410, an event history management UI 411, a configuration management UI 412, and a hot folder UI I/F 413. The job management UI 407 is a UI display module used to manage a print job. The printer management UI 408 displays information about the printing apparatus 102 managed in the hot folder. The hot folder management UI 409 displays information about the hot folder managed by itself. The job ticket management UI 410 displays setting information and print data called as a job ticket to be sent to the printing apparatus 102. The event history management UI 411 displays the history of pieces of information about various events such as print completion and the exhaustion of paper sheets, which are transmitted from the printing apparatus 102. The configuration management UI 412 is a display module for setting information of the hot folder program. The hot folder UI I/F 413 serves as an interface with the hot folder control module 403.

The hot folder control module 403 includes a hot folder control I/F 414, a job management module 415, a printer management module 416, and a hot folder management module 417. The hot folder control module 403 also includes a job ticket management module 418, an event history management module 419, a configuration management module 420, and a device control I/F 421. The hot folder control I/F 414 is connected with the hot folder monitoring I/F 406 and the hot folder UI I/F 413. The job management module 415 manages a print job. The printer management module 416 manages a printer managed in the hot folder. The hot folder management module 417 manages hot folder information. The job ticket management module 418 manages a job ticket. The event history management module 419 manages the history of pieces of information about various events such as print completion and the exhaustion of paper sheets, which are transmitted from the printing apparatus 102. The configuration management module 420 manages setting information of the hot folder program. The device control I/F 421 serves as an interface with the printing apparatus 102.

[Hot Folder]

A method of processing the hot folder in the information processing apparatus 101 according to this embodiment will be described below. As a hot folder, there is a flexible type hot folder and a fix type hot folder. For a flexible type hot folder, a job is input by copying, as job data, data (to also be referred to as contents hereinafter) to be printed and a print setting file (to also be referred to as a job ticket hereinafter) in the hot folder. On the other hand, for a fix type hot folder, a job ticket is associated with the hot folder in advance and then a job is input by only inputting contents. A fix type hot folder will be described below unless otherwise specified. The present invention, however, is also applicable to a flexible type hot folder.

[Creation of Hot Folder]

To use a hot folder in the information processing apparatus 101, a hot folder needs to be created. The hot folder management module 417 shown in FIG. 4 creates a hot folder. The module 417 designates a folder existing in the external storage device 304 by the user operation of the hot folder management UI 409 displayed on the display 204, thereby creating a hot folder in the external storage device 304. Note that a hot folder creation location is not necessarily in the external storage device 304 within the information processing apparatus 101 on which a hot folder program operates. For example, a shared folder of another PC or the like connected via the network 110 may be set as a hot folder.

[Association of Job Ticket]

When creating a hot folder as described above, a job ticket is designated, thereby allowing to create a hot folder as a fix type hot folder with which the job ticket is associated. Note that if a job ticket is not designated in creating a hot folder, the hot folder is considered as a flexible type hot folder.

[Storage of Hot Folder Information]

When a hot folder is created, the hot folder management module 417 manages information designated using the hot folder management UI, and the external storage device 304 stores the folder path, the job ticket, the target printer, and the like of the hot folder.

[Input of Job]

The user can input job data in a created hot folder. The job data indicates contents and a job ticket. Some methods of inputting job data can be used. The user who operates the pointing device 202, for example, drags and drops a file of contents in a hot folder on a GUI displayed on the display 204. Alternatively, an upper level application may copy a file of contents in a hot folder.

[Method of Monitoring Hot Folder]

Figure 5:
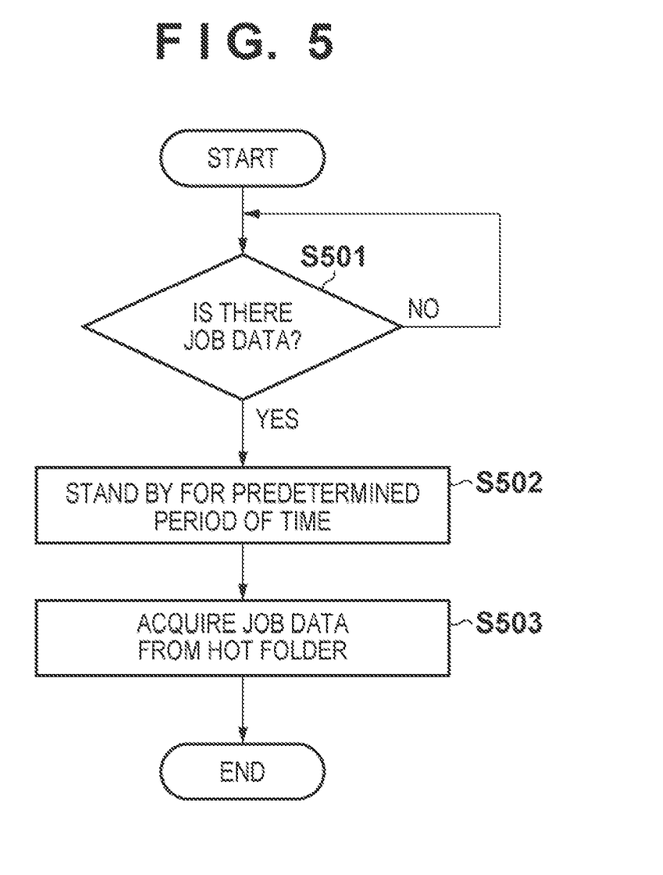
FIG. 5 is a flowchart illustrating the procedure of job monitoring processing for a hot folder according to the first embodiment.

The hot folder monitoring module 401 monitors whether job data is input in a hot folder. FIG. 5 is a flowchart illustrating the procedure of job monitoring processing for a hot folder according to this embodiment. The processing shown in FIG. 5 is executed by, for example, the CPU 301 of the information processing apparatus 101.

In step S501, the hot folder monitoring module 401 polls a hot folder. If a hot folder program detects an unlocked file in the target hot folder, it determines that there exists input job data. Alternatively, if there is no file or if a file exists but the file is locked (the file is in a locked state), the hot folder program determines that there is no input job data.

If it is determined that there exists job data, the job data has undergone a copy operation or a copy operation has just started and the job data has not been locked. In either state, the hot folder monitoring module 401 stands by for a predetermined period of time in step S502 to correctly process the hot folder. After the predetermined period of time elapses, the hot folder monitoring module 401 acquires the job data in step S503.

[Method of Setting Standby Time]

Figure 6:
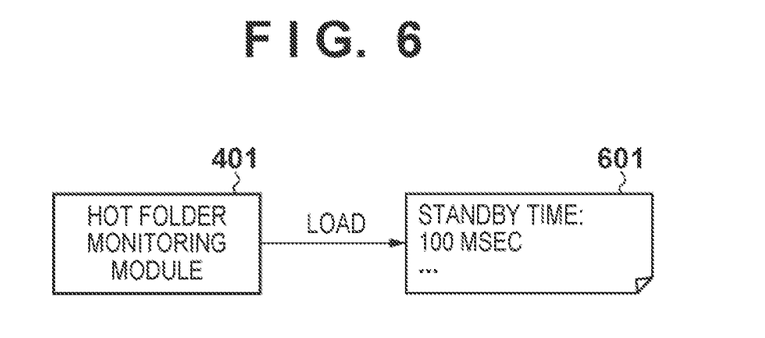
FIG. 6 is a view showing an example of setting of a standby time.

The predetermined standby time in step S502 may be set according to the environment shown in FIG. 1. As shown in FIG. 6, for example, by storing, in a storage area of the information processing apparatus 101, a setting file 601 in which operation settings of the hot folder monitoring module 401 are described, and describing a standby time in the file 601, it may be possible to change the predetermined standby time. In this case, when executing the processing shown in FIG. 5, the hot folder monitoring module 401 loads the setting file 601, and stands by for the standby time acquired from the file 601.

[Transmission of Job Data]

The hot folder monitoring module 401 passes the job data acquired in step S503 to the hot folder control module 403. The hot folder control module 403 passes the job data to the printing apparatus 102 via the device control I/F 421 to instruct printing (print processing).

As described above, according to this embodiment, it is possible to appropriately process job data being copied in a hot folder between different OSs without misidentifying the job data as that which has undergone a file copy operation.

Second Embodiment

In the first embodiment, processing of determining whether a file copy operation of job data is complete includes detecting a file (job data) again when a predetermined period of time elapses after the file is detected. In this embodiment, in consideration of a case in which a delay in starting a file lock is longer than a predetermined period of time, completion of a file copy operation of job data is determined based on the file size of the job data.

Figure 7:
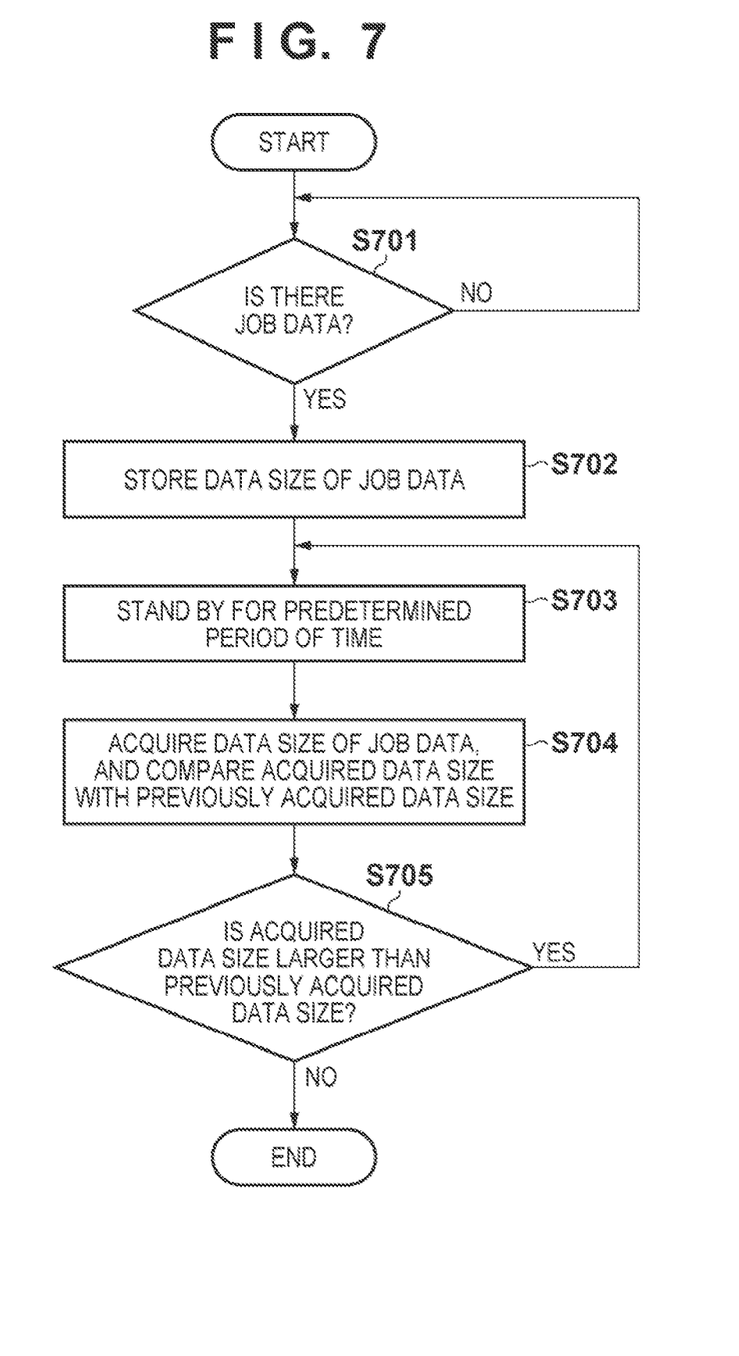
FIG. 7 is a flowchart illustrating the procedure of job monitoring processing for a hot folder according to the second embodiment.

FIG. 7 is a flowchart illustrating the procedure of job monitoring processing for a hot folder according to this embodiment. The processing shown in FIG. 7 is executed by, for example, a CPU 301 of an information processing apparatus 101. In step S701, the CPU 301 polls a hot folder. If it is determined that there exists job data, its file size (an example of the first acquisition operation of acquiring the first size) is stored in step S702. In step S703, the CPU 301 stands by for a predetermined period of time as in step S502. In step S704, the CPU 301 acquires the job data again to acquire its file size (an example of the second acquisition operation of acquiring the second size). Then, the CPU 301 compares the file size acquired in step S704 with that stored in step S702. In step S705, it is determined as a result of the comparison whether the file size acquired in step S704 is larger than that stored in step S702. If it is determined that the file size acquired in step S704 is larger than that stored in step S702, the CPU 301 determines that the job data is being copied, and stores, as a data size, the file size determined to be larger. The process returns to step S703 to stand by for the predetermined period of time. Alternatively, if it is determined that the file size acquired in step S704 is not larger than that stored in step S702, the CPU 301 determines that the copy operation is complete.

The processes shown in FIGS. 5 and 7 may be switched depending on the settings of the information processing apparatus 101.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-288554, filed Dec. 24, 2010, which is hereby incorporated by reference herein in its entirety.

What is claimed is:

1. An information processing apparatus comprising:
   a creating unit configured to create a folder by designating on whether a print setting file is associated with the folder or not;
   a detection unit configured to detect a file stored in the folder created by the creating unit;
   a processing unit configured to process the file detected by the detection unit; and
   a control unit configured to control, in a case where said detection unit detects the file stored in the folder, the processing unit to suspend operation for a predetermined period of time without processing the file,
   wherein the control unit controls the processing unit to process the file in a case where the file is not in a locked state and the predetermined period of time has elapsed, and
   wherein, in a case where the folder is created by designating that the print setting file is associated with the folder, the processing unit processes data to be printed which is stored in the folder, as the file to be processed by the processing unit, and in a case where the folder is created by designating that the print setting file is not associated with the folder, the processing unit processes the print setting file and corresponding data to be printed that are stored in the folder, as the file to be processed by the processing unit.

2. The apparatus according to claim 1, wherein the control unit controls the processing unit to suspend for the predetermined period of time based on an operation setting associated with the folder.

3. The apparatus according to claim 1, wherein the processing of the file by the processing unit is print processing.

4. An information processing method for an information processing apparatus, comprising:
   a creating step of creating a folder by designating on whether a print setting file is associated with the folder or not;
   detecting a file stored in the folder created by the creating step;
   processing the file detected by the detection step; and
   controlling, in a case where the file stored in the folder is detected, the processing to suspend operation for a predetermined period of time without processing the file,
   wherein processing of the file includes processing the file in a case where the file is not in a locked state and the predetermined period of time has elapsed, and
   wherein, in a case where the folder is created by designating that the print setting file is associated with the folder, data to be printed which is stored in the folder, as the file to be processed, is processed, and in a case where the folder is created by designating that the print setting file is not associated with the folder, the print setting file and corresponding data to be printed that are stored in the folder, as the file to be processed, are processed.

5. The method according to claim 4, wherein the processing is controlled to suspend for the predetermined period of time based on an operation setting associated with the folder.

6. The method according to claim 4, wherein the processing of the file is print processing.

7. A non-transitory storage medium on which is stored a computer-readable storage program which when executed by the computer performs an information processing method for an information processing apparatus, the method comprising:
   a creating step of creating a folder by designating on whether a print setting file is associated with the folder or not;
   detecting a file stored in the folder created by the creating step;
   processing the file detected by the detection step; and
   controlling, in a case where the file stored in the folder is detected, the processing to suspend operation for a predetermined period of time without processing the file,
   wherein processing of the file includes processing the file in a case where the file is not in a locked state and the predetermined period of time has elapsed, and
   wherein, in a case where the folder is created by designating that the print setting file is associated with the folder, data to be printed which is stored in the folder, as the file to be processed, is processed, and in a case where the folder is created by designating that the print setting file is not associated with the folder, the print setting file and corresponding data to be printed that are stored in the folder, as the file to be processed, are processed.

8. The non-transitory storage medium according to claim 7, wherein said control step controls the processing to suspend for the predetermined period of time based on an operation setting associated with the folder.

9. The non-transitory storage medium according to claim 7, wherein the processing of the file is print processing.

* * * * *